Sept. 15, 1953 J. F. DEWHIRST 2,652,125
ENGINE STOPPING DEVICE FOR MOTOR VEHICLES
Filed Dec. 18, 1950 2 Sheets-Sheet 1
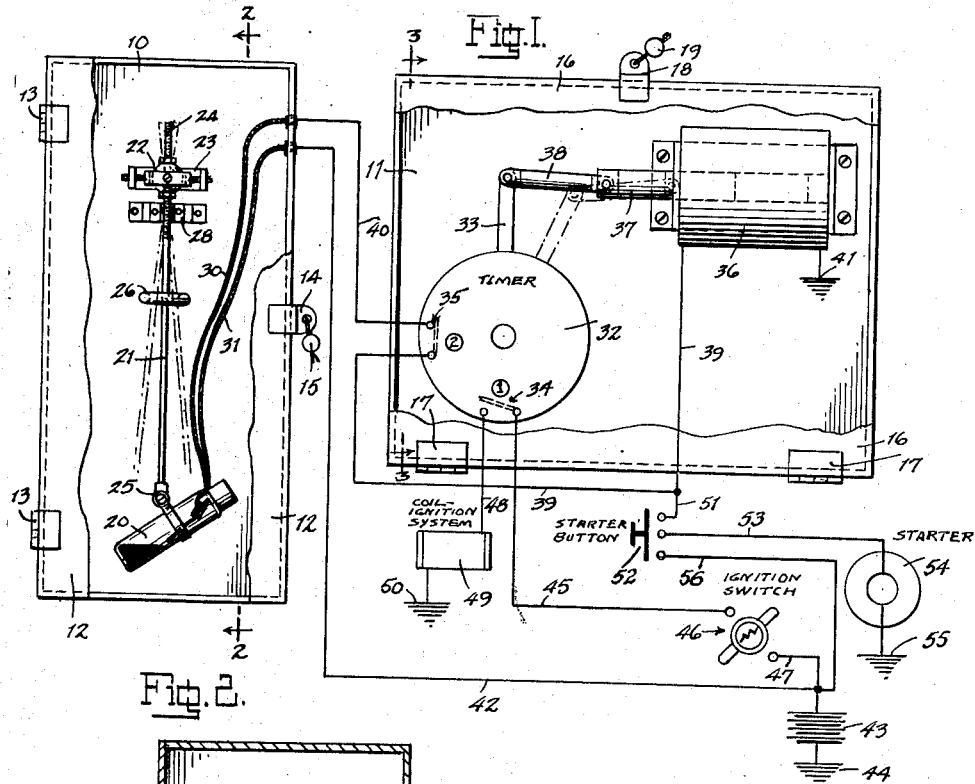
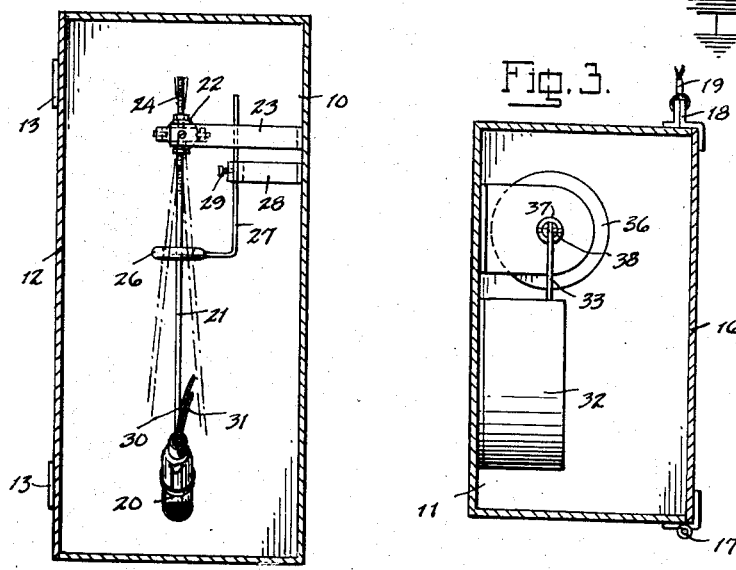
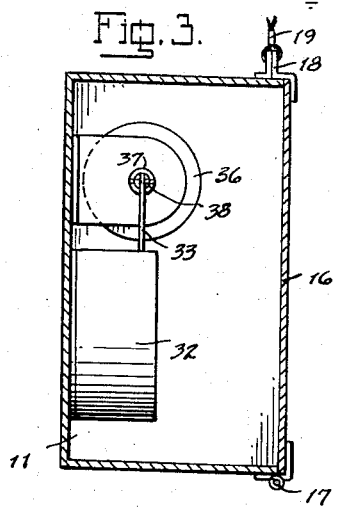
Inventor
JOSEPH F. DEWHIRST
By
Attorney Sept. 15, 1953          J. F. DEWHIRST          2,652,125

ENGINE STOPPING DEVICE FOR MOTOR VEHICLES

Filed Dec. 18, 1950          2 Sheets-Sheet 2

Inventor

JOSEPH F. DEWHIRST

By

Attorney

Patented Sept. 15, 1953

2,652,125

UNITED STATES PATENT OFFICE 2,652,125

ENGINE STOPPING DEVICE FOR MOTOR VEHICLES

Joseph F. Dewhirst, Bridgeport, Conn.

Application December 18, 1950, Serial No. 201,390

2 Claims. (Cl. 180—82)

The present invention relates to a device for automatically stopping a motor vehicle engine after a predetermined stationary period of the motor vehicle, and is particularly intended for use with an internal combustion or other type of engine depending on an electrical circuit for operation, for instance, the ignition circuit, in the case of an internal combustion engine, and in the case of an electric motor the power line to the motor from a storage battery.

It is an object of the invention to utilize the motion of the motor vehicle in the automatic operation of the device, without the necessity for connection of the device with the engine or motor except by the use of lead wires connected to the electrical system of the engine or motor. It is thus possible to mount the device in a protected position, as for instance in the cab of a truck, by merely making the lead wires to the electrical system of suitable length.

The invention is especially intended to prevent the continued operation of an engine if it is left running unintentionally, or in the case of delivery trucks or the like, if the delivery man leaves the engine running while making a delivery. Thus in the case of a milk truck the timer means employed as a part of the device can be set so that it will not stop the engine during normal door-to-door delivery periods requiring the stoppage of the truck for only a minute or so, but will stop the engine if the milkman is delayed for an unusually long period, say four minutes or more.

With the above and other objects in view an embodiment of the invention is shown in the accompanying drawing, and this embodiment will be hereinafter more fully described with reference thereto, and the invention will be finally pointed out in the claims.

In the drawings:

Fig. 1 is a front elevation of one embodiment of the invention, partially broken away, and showing schematically the electrical connections with the starter and ignition system.

Fig. 2 is a sectional view on line 2—2 of Fig. 1.

Fig. 3 is a sectional view on line 3—3 of Fig. 1.

Figure 4:
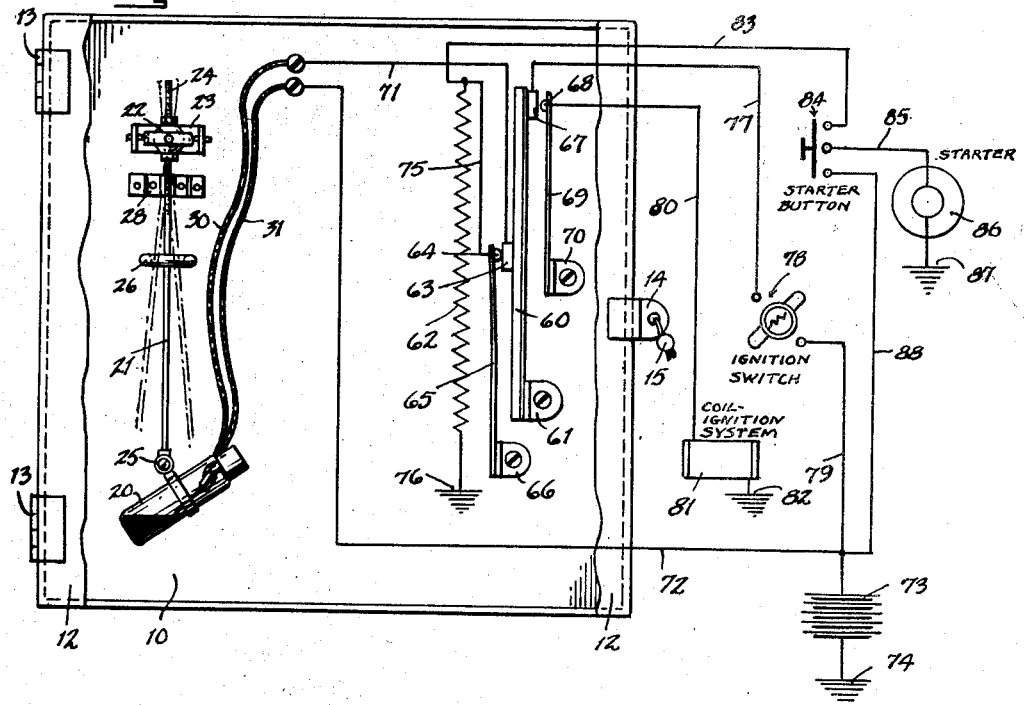
Fig. 4 is a front elevation showing a modified embodiment of the invention.

Referring to Figs. 1 to 3 of the drawings, the main control parts of the device are contained in a pair of suitably shaped boxes 10 and 11, preferably constructed of metal, the box 10 having a cover hinged at 13, and being provided with a hasp 14 adapted to be secured by suitable seal 15, so that the operating parts cannot be tampered with to render them inoperative without first breaking the seal. The box 11 is similarly provided with a cover 16 hinged at 17 and provided with a hasp 18 adapted to be secured by a seal 19.

Within the container 10 there is provided the motion actuated switch means of the device, and which consists of a mercury switch 20 suspended as a pendulum upon the lower end of a rod 21 pivotally supported near its upper end within a gimbal type universal joint 22, this joint being supported upon a bracket 23 secured to one wall of the box. The rod 21 is threaded at its upper end as at 24, and is screwed in the inner member of the joint 22, so that the rod may be vertically adjusted within the joint to vary the suspended length of the rod. The mercury switch 20 is adjustably connected to the lower end of the rod by a joint 25, so as to permit the angular adjustment of the tube of the switch for the purpose of disposing the mercury in proper relation to the switch terminals.

In the vertical position of the rod 21, which it assumes by gravity when the vehicle is stationary, the mercury switch is open as shown in Fig. 1. A slanting or inclined position of the vehicle will not affect the switch as the rod 21 will hang vertically in any case. As soon as motion is applied to the vehicle the rod 21 will be caused to swing, such motion being produced by such normal movement producing impulses as acceleration, deceleration, centrifugal forces, etc. The swinging movement of the rod 21 is restricted by a ring 26 surrounding the rod and mounted for vertical adjustment by means of a vertical rod 27 secured to the ring and adjustably engaged in a bracket 28 secured to the wall of the box, the adjusted position being fixed by set screw 29. By raising the ring the range of swing of the rod 21 is increased and by lowering the ring it is decreased. The ring acts as an impact member so that as the rod hits it in moving to the right, as seen in Fig. 1, the tube is stopped suddenly, and the mercury continues on, from inertia of its original motion, so that it momentarily engages the terminals and closes the switch, or if the rod is moving to the left, or away from the side the contacts are on, the mercury is propelled back toward the contacts by virtue of the reaction against the wall of the tube which has been stopped suddenly. Other random forces set up by the motion of the vehicle will also act to propel the mercury into switch closing relation. The terminals of the switch have relatively long flexible conductor wires 30 and 31 connected thereto and which extend to suitable points in the wall of box 10 for the attachment of the leads to the other operating parts of the device, as will presently more fully appear. The wires 30 and 31 are of sufficient length and flexibility so that they will not interfere with the free swinging movement of the switch.

Within the box 11 there is mounted a timer switch unit 32 having a pivoted reset lever 33 and two switches 34 and 35, the timer mechanism being such that in the normal position of the reset arm shown in full lines the switch 34 is open and the switch 35 is closed. In the full reset position, indicated by the dot-and-dash lines, the switch 34, which may be referred to as the #1 switch, is closed and remains closed until the timer has its full return movement to the full line position. The switch 35, which may be referred to as #2 switch, is open in the full reset position and remains open during the first portion of the return movement of the arm, but is automatically closed during the latter part of the return movement and remains closed until and after the arm reaches its fully returned position. Thus, for instance, if the timer is adjusted to operate for a four minute interval the #2 switch may be adjusted so that it will remain open during the first two minutes and will be closed during the remaining two minutes. Timer devices of this type are well known, being used on automatic washers, toasters, industrial applications, kitchen timers, etc. so that a detailed illustration of the timing mechanism is not deemed necessary. For the purpose of the present invention it is only necessary that the switch have sufficient capacity to carry ignition without affecting operation of the engine, that it be able to stand heavy use, that the resetting lever may be operated without great force by the action of a solenoid, and that it have enough follow through in its operation to keep the breaker points well open after the predetermined time interval has elapsed.

Also mounted within the box 11 is a solenoid 36 having its core 37 connected by a link 38 to the reset lever 33, energizing of the solenoid causing the reset arms to be pulled from the full line switch opening position to the dotted line switch closing position. The solenoid is connected at one side by a lead 39 extending to one side of the #2 timer switch 35, the other side of the switch 35 being connected by a lead 40 to the conductor wire 30 of the mercury switch. The other side of the solenoid is grounded, as at 41, and the other conductor wire 31 of the mercury switch is connected by a lead 42 to the battery 43, which is grounded in the usual manner, as at 44. Thus with the switch 35 in its closed position the circuit form of the mercury switch to the solenoid is completed whenever the mercury switch is agitated to the point where it closes, and will therefore cause the solenoid to be energized to reset the timer.

The connection with the ignition system consists of a lead 45 extending from one side of the #1 timer switch 34 to one side of the key-operated ignition switch 46, the other side of which is connected by a lead 45 to the battery through the lead 39 from the mercury switch. The other side of the timer switch 34 is connected by a lead 48 to the coil 49 of the ignition system of the engine which system is grounded in the usual manner as at 50. It will thus be seen that with ignition switch 46 closed and the #1 timer switch 34 closed by resetting of the timer, the circuit of the ignition system of the engine is completed.

In order to close the ignition system upon starting the engine, and before the motion actuated mercury switch will take over the automatic operation of the device, the solenoid is also connected to the starter circuit by a lead 51 connected to the lead 39 from the mercury switch, the lead 51 being connected to the first contact of a three-contact switch 52, a lead 53 extending from the second contact to one side of the starter 54 which is grounded at its other side as at 55.

The starter circuit is completed to the battery by a lead 56 extending from the third contact of the starter button to the battery. Thus when the starter button is pressed to operate the starter, the solenoid is simultaneously energized to pull the reset lever to its dotted line position to close the #1 timer switch 34 and thus close the circuit of the ignition system, the ignition switch 46 having been previously closed as a preliminary to the starting operation. The three-contact switch 52 may, if desired, be of a type to allow for resetting the timer independently of the starter.

With the timer set say for a four-minute interval of operation of the #1 timer switch 34 and a two-minute interval of the operation of the #2 timer switch 35, the device will automatically operate to close the ignition circuit during the first two minutes of operation of the timer without a resetting operation of the solenoid during this two-minute interval, the motion induced closing of the mercury switch being ineffective to cause energizing of the solenoid because of the fact that the #2 timer switch 35 is open during this first two-minute interval. When the switch 35 is closed at the end of the two-minute interval the motion induced closing of the mercury switch will be effective to cause the solenoid to be energized to fully reset the timer, the cycle of operation being thereupon repeated. Thus the solenoid is not in such frequent operation as it would be if the circuit of the mercury switch was closed at the beginning of the resetting of the timer, its operation being only at intervals of two minutes or more. When the vehicle remains stationary for a period equal to the full period for which the timer is set the resetting circuit will be open through opening of the mercury switch, although the #2 timer switch 35 will be closed, and the ignition circuit will be open by the opening of the #1 timer switch 34. The engine will therefore automatically stop.

Figure 5:
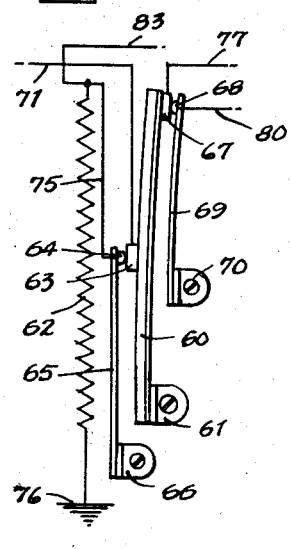
Figs. 5 and 6 show two operative positions of the timer switch.
Figure 6:
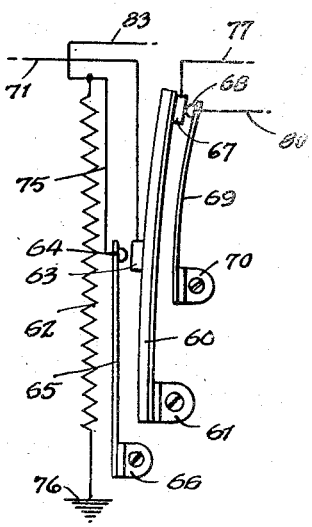

In the modification of the invention shown in Figs. 4 to 6 a bimetallic thermostat timer unit is employed instead of the timer and solenoid as shown in the first embodiment. For convenience the box 10 housing the motion actuated mercury switch 20 is made sufficiently large so as to also house the thermostat timer unit. This unit consists of a bimetallic strip 60 having a mounting bracket 61 at one end and having associated therewith a resistance or heating coil 62 which upon being energized causes the bimetallic strip 60 to bend, this bending movement being utilized to make and break the ignition circuit, as will presently more fully appear.

At one side of the bimetallic strip at a point intermediate its ends there is secured a contact 63 adapted to cooperate with a contact 64 carried upon a spring bar 65 mounted upon a bracket 66; and at the other side of the bimetallic strip adjacent its outer end there is provided a contact 67 adapted to cooperate with a contact 68 upon the end of a spring bar 69 supported upon a bracket 70. In the normal straight position of the bimetallic strip, as shown in Fig. 4, the contact 64 is engaged with the contact 63, the spring bar 65 being sprung outwardly under tension, and the contact 68 is disengaged from the contact 67, the spring bar 69 being in a straight untensioned position.

The flexible conductors 30 and 31 of the mercury switch are respectively connected to a lead 71 extending to the contact 63 of the bimetallic strip, and a lead 72 extending to the battery 73 which is grounded at 74. The contact 64 of the spring bar 65 is connected by a lead 75 to one end of the resistance or heating coil 62, the other end of which is grounded at 76. These connections complete the mercury switch circuit, causing the coil 62 to become heated when the mercury switch is closed and the contacts 63 and 64 are in engagement.

The connection with the ignition system consists of a lead 77 extending from the contact 67 of the bimetallic strip 60 to one side of the key-operated ignition switch 78, the other side of which is connected to the battery by a lead 79. The contact 68 of the spring bar 69 is connected by a lead 80 to the coil 81 of the ignition system of the engine, which system is grounded in the usual manner at 82. This completes the circuit of the ignition system which is closed when the key-operated ignition switch 78 is closed and when the contacts 67 and 68 are in engagement.

In order to close the ignition system upon starting the engine, and before the motion actuated mercury switch takes over the automatic operation of the device, the resistance or heating coil 62 is also connected to the starter circuit by a lead 83 connected to the first contact of a three-contact starter button or switch 84, a lead 85 extending from the second contact to one side of the starter 86, the other side of which is grounded at 87. The starter circuit is completed to the battery 73 through a lead 88 extending from the third contact of the starter button to the battery. Thus when the starter button is pressed to operate the starter the heating coil circuit is simultaneously energized to operate the thermostat timer switch through the bending or deformation of the bimetallic strip, this action causing the contact 67 and 68 to engage, as shown in Fig. 5, thus completing the ignition circuit, the key actuated ignition switch 78 having been previously closed as a preliminary to the starting operation. The three-contact switch 84 may, if desired, be of a type to allow for energizing the coil 62 independently of the starter.

In the position of the bimetallic strip shown in Fig. 5 the spring arm 69 is bent outwardly under tension so that if there is no reenergizing of the resistance or heating coil 62 the bimetallic strip will gradually return to its normal straight position as shown in Fig. 4, and will at the end of this return movement open the ignition circuit and stop the engine, the engine however having been allowed to run a sufficient period during the return movement of the bimetallic strip to normally allow the vehicle to be put in motion and thus allow the motion actuated mercury switch to take over the automatic operation of the device. During this period the contacts 63 and 64 are engaged so that whenever there is any motion and consequent closing of the mercury switch, the circuit to the resistance or heating coil is completed causing the bimetallic strip to continue its deformation or bending movement.

In order to prevent excessive and unnecessary heating and bending of the bimetallic strip the contacts are so arranged that the continued bending beyond the position as shown in Fig. 5 to the position as shown in Fig. 6 will disengage the contacts 63 and 64 after the maximum bend of the strip is achieved, while the contacts 67 and 68 of the ignition circuit remain engaged, thus preventing further energizing of the heating coil and bending of the strip until necessary. At the point where the strip reaches the intermediate position shown in Fig. 5 closing of the mercury switch through motion imparted thereto will reenergize the heating coil and again cause the bending of the strip to the position shown in Fig. 6. When the vehicle is brought to a stop, however, and the mercury switch is stationary and open, the bimetallic strip will continue its return movement until it reaches its normal straight position at which time the ignition circuit is open through disengagement of the contact 67 and 68 and the engine is automatically stopped. The time interval required for the return of the bimetallic strip from its maximum bend position to its straight position may be predetermined by the selection of the proper components making up the strip.

It will be understood that the electrical circuits may include relays, transformers, and other suitable elements, in accordance with well known electrical engineering practice.

I have illustrated and described preferred and satisfactory embodiments of the invention but it will be understood that changes may be made therein, within the spirit and scope thereof, as defined in the appended claims.

What is claimed is:

1. The combination with a motor vehicle having a driving engine and means controlling the stopping of said engine, of a normally inert mercury switch member movably supported upon the motor vehicle at a point of support fixed with respect to the motor vehicle, and whereby, when said point of support moves with the transitional movement of the motor vehicle, the gravitational reaction upon said member causes a movement of said member relatively to its point of support, an electrical circuit connected to said member arranged to be open in its inert position and closed in its relatively moved position, timer means having a predetermined operating period and including time delay means arranged to be set in operation upon closing of said circuit, and means operatively connecting said control means to said timer means to cause said control means to stop the engine at the end of said operating period of said timer means.

2. A control device for stopping a motor vehicle engine after a predetermined stationary period of the vehicle, said engine having control means adapted to be actuated to stop the engine and an electrical starter circuit, comprising means controlled by the motion of the vehicle having operative positions respectively affected by motion and cessation of motion, timer means having a predetermined operating period and including time delay means arranged to be set in operation by said motion controlled means in the motion affected position of the latter and means adapted to be operatively connected to said control means to stop the engine at the end of said operating period through cessation of motion of said vehicle, and means adapted to be interposed in said starter circuit to set said time delay means in operation independently of said motion controlled means.

JOSEPH F. DEWHIRST.

References Cited in the file of this patent

UNITED STATES PATENTS

| Number | Name | Date |
|---|---|---|
| 1,442,311 | Watson | Jan. 16, 1923 |
| 1,442,312 | Watson | Jan. 16, 1923 |
| 1,442,313 | Watson | Jan. 16, 1923 |
| 1,542,051 | Gedney | June 16, 1925 |
| 2,470,532 | Thomas | May 17, 1949 |